US 8,749,300 B2

(12) United States Patent
Pi et al.

(10) Patent No.: US 8,749,300 B2
(45) Date of Patent: Jun. 10, 2014

(54) DC VOLTAGE CONVERSION CIRCUIT OF LIQUID CRYSTAL DISPLAY APPARATUS

(71) Applicants: Electronics and Telecommunications Research Institute, Daejeon (KR); Konkuk University Industrial Cooperation Corp, Seoul (KR)

(72) Inventors: Jae Eun Pi, Seongnam-si (KR); Kee Chan Park, Seongnam-si (KR); Hong Kyun Leem, Seoul (KR); Joon Dong Kim, Uiwang-si (KR); Youn Kyung Kim, Daejeon (KR); Ji Sun Kim, Yongin-si (KR); Byoung Gon Yu, Chungcheongbuk-do (KR); Sang Hee Park, Daejeon (KR); Him Chan Oh, Seoul (KR); Min Ki Ryu, Daejeon (KR); Chi Sun Hwang, Daejeon (KR)

(73) Assignees: Electronics and Telecommunications Research Institute, Daejeon (KR); Konkuk University Industrial Cooperation Corp., Seoul (KR)

( * ) Notice: Subject to any disclaimer, the term of this patent is extended or adjusted under 35 U.S.C. 154(b) by 24 days.

(21) Appl. No.: 13/633,654

(22) Filed: Oct. 2, 2012

(65) Prior Publication Data
US 2013/0088285 A1    Apr. 11, 2013

(30) Foreign Application Priority Data
Oct. 10, 2011  (KR) .................. 10-2011-0103231

(51) Int. Cl.
  *G05F 1/10* (2006.01)
  *H02M 3/07* (2006.01)
(52) U.S. Cl.
  CPC .................. *H02M 3/073* (2013.01)
  USPC ....................................... 327/536
(58) Field of Classification Search
  USPC .............. 327/530, 534–543; 363/59, 60
  See application file for complete search history.

(56) References Cited

U.S. PATENT DOCUMENTS

| 7,508,253 | B1 * | 3/2009 | Wu et al. ............... 327/536 |
| 2010/0085111 | A1 * | 4/2010 | Ootani et al. ............... 327/536 |

FOREIGN PATENT DOCUMENTS

| KR | 10-2005-0123328 A | 12/2005 |
| KR | 10-2011-0068238 A | 6/2011 |
| KR | 10-2012-0078556 A | 7/2012 |

OTHER PUBLICATIONS

Leem et al., "A DC-DC Converter with Symmetric On/Off Margin", IMID 2011 Digest, 2011.
Oh et al., "Charge pump circuit for depletion-mode oxide TFTs", Electronics Letters, vol. 47, No. 6, Mar. 17, 2011.

* cited by examiner

*Primary Examiner* — Sibin Chen
(74) *Attorney, Agent, or Firm* — Rabin & Berdo, P.C.

(57) ABSTRACT

Disclosed is a DC voltage conversion circuit of a liquid crystal display apparatus, including: a main pumping circuit including a plurality of thin film transistors and configured to output voltage for driving a liquid crystal display apparatus when the plurality of thin film transistors are alternately turned on or off; and a switch control signal generator configured to control voltages applied to gates of the plurality of thin film transistors by inversion of a clock signal, in which each thin film transistor is turned on when positive gate-source voltage is applied thereto, and turned off when negative gate-source voltage is applied thereto.

6 Claims, 12 Drawing Sheets

<PRIOR ART>

<PRIOR ART>

<PRIOR ART>

US 8,749,300 B2

DC VOLTAGE CONVERSION CIRCUIT OF LIQUID CRYSTAL DISPLAY APPARATUS

CROSS-REFERENCE TO RELATED APPLICATIONS

This application is based on and claims priority from Korean Patent Application No. 10-2011-0103231, filed on Oct. 10, 2011, with the Korean Intellectual Property Office, the disclosure of which is incorporated herein in its entirety by reference.

TECHNICAL FIELD

The present disclosure relates to a DC voltage conversion circuit of a liquid crystal display apparatus, and more particularly, to a DC voltage conversion circuit of a liquid crystal display apparatus capable of generating higher voltage from limited DC power supply voltage and a clock signal to utilize the generated voltage for driving the liquid crystal display apparatus.

BACKGROUND

A thin film transistor (hereinafter, referred to as a "TFT") is embedded and used in a liquid crystal display apparatus by using a merit capable of forming the TFT on a large-sized glass substrate and the like. Currently, an amorphous silicon (a-Si) TFT is used in most liquid crystal display apparatuses, but recently, as screen scanning efficiency is increased up to 480 Hz, a TFT having more excellent current driving capacity has been required. An oxide TFT uses metal oxide such as IGZO (In—Ga—Zn—O), ZnO and the like as an active layer, and since the oxide TFT has electron mobility of 10 cm$^2$/Vs or more as illustrated in FIG. 1, the current driving capacity is ten times or higher than an existing a-Si TFT.

However, in the oxide TFT, since a characteristic is changed due to a minute condition change in a manufacturing process, or voltage and light, a depletion-mode operation characteristic having negative threshold voltage $V_T$ is shown.

In the existing a-Si TFT, since the threshold voltage $V_T$ has a positive value, the a-Si TFT is turned off when gate-source voltage $V_{GS}$ is 0 V and thus a driving circuit is easily configured. However, since the oxide TFT (hereinafter, referred to as an "oxide TFT") having the depletion-mode operation characteristic have negative threshold voltage $V_T$ as illustrated in FIG. 2, the oxide TFT is not turned off and current flows even in the case where the gate-source voltage $V_{GS}$ is 0 V. Accordingly, in order to completely turn off the depletion-mode TFT, the negative threshold voltage $V_T$ needs to be applied. In order to solve the problem and configure an embedded circuit of the liquid crystal display apparatus by using the depletion-mode TFT, a new circuit capable of applying the negative threshold voltage $V_T$ needs to be designed.

FIG. 3 is a diagram illustrating a DC voltage conversion circuit in the related art, and FIG. 4 is a diagram illustrating a DC voltage conversion circuit in the related art which operates in response to a characteristic of a depletion-mode TFT which improves the DC voltage conversion circuit in the related art ("Charge pump circuit for depletion-mode oxide TFTs", M. W. Oh, et al., Electronics Letters, Vol. 47, No. 6, 2011).

Referring to FIGS. 3 and 4, since the DC voltage conversion circuit in the related art uses only an N-type TFT, a circuit may be configured by using the a-Si TFT or oxide TFT, and all TFTs are turned off when the gate-source voltage $V_{GS}$ is −5 V, such that the circuit may operate normally even in the depletion-mode TFT. However, when the TFT is turned on, since 0 V is applied as the gate-source voltage $V_{GS}$, a general TFT having threshold voltage $V_T$ of 0 V or more is not turned on, such that the circuit is difficult to operate normally.

SUMMARY

The present disclosure has been made in an effort to provide a DC voltage conversion circuit of a liquid crystal display apparatus against wide distribution of threshold voltage $V_T$ by applying positive gate-source voltage $V_{GS}$ when turning on a TFT, and applying negative gate-source voltage $V_{GS}$ when turning off the TFT.

An exemplary embodiment of the present disclosure provides a DC voltage conversion circuit of a liquid crystal display apparatus, including: a main pumping circuit including a plurality of thin film transistors and configured to output voltage for driving a liquid crystal display apparatus when the plurality of thin film transistors are alternately turned on or off; and a switch control signal generator configured to control voltage applied to a gate of the plurality of thin film transistors by inversion of a clock signal, in which each thin film transistor is turned on when positive gate-source voltage is applied thereto, and turned off when negative gate-source voltage is applied thereto.

According to the exemplary embodiment of the present disclosure, by providing a DC voltage conversion circuit of a liquid crystal display apparatus which applies positive gate-source voltage $V_{GS}$ when turning on a TFT and applies negative gate-source voltage $V_{GS}$ when turning off the TFT, since the DC voltage conversion circuit has a large voltage margin when the TFT is turned on as compared with a DC voltage conversion circuit in the related art, it is possible to stably maintain power efficiency even in large load current and thus show stable output voltage and power efficiency against wide distribution of threshold voltage $V_T$.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings. In describing the present disclosure, well-known functions or constructions will not be described in detail since they may unnecessarily obscure the understanding of the present disclosure.

Figure 1:
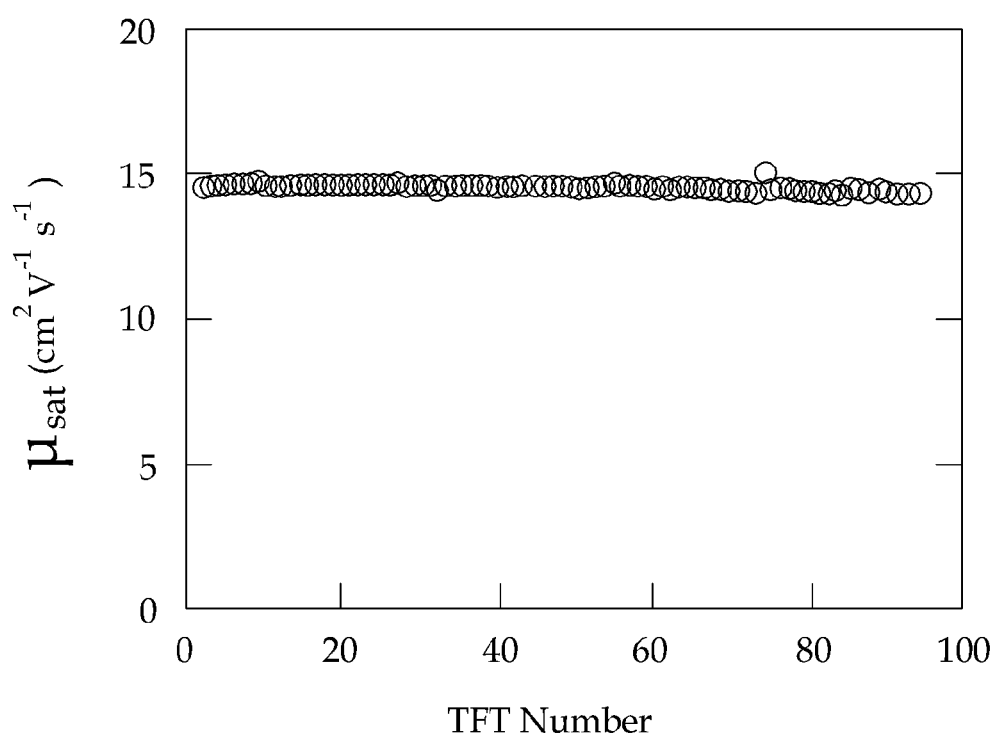
FIG. 1 is a graph illustrating electron mobility of an oxide TFT.
Figure 2:
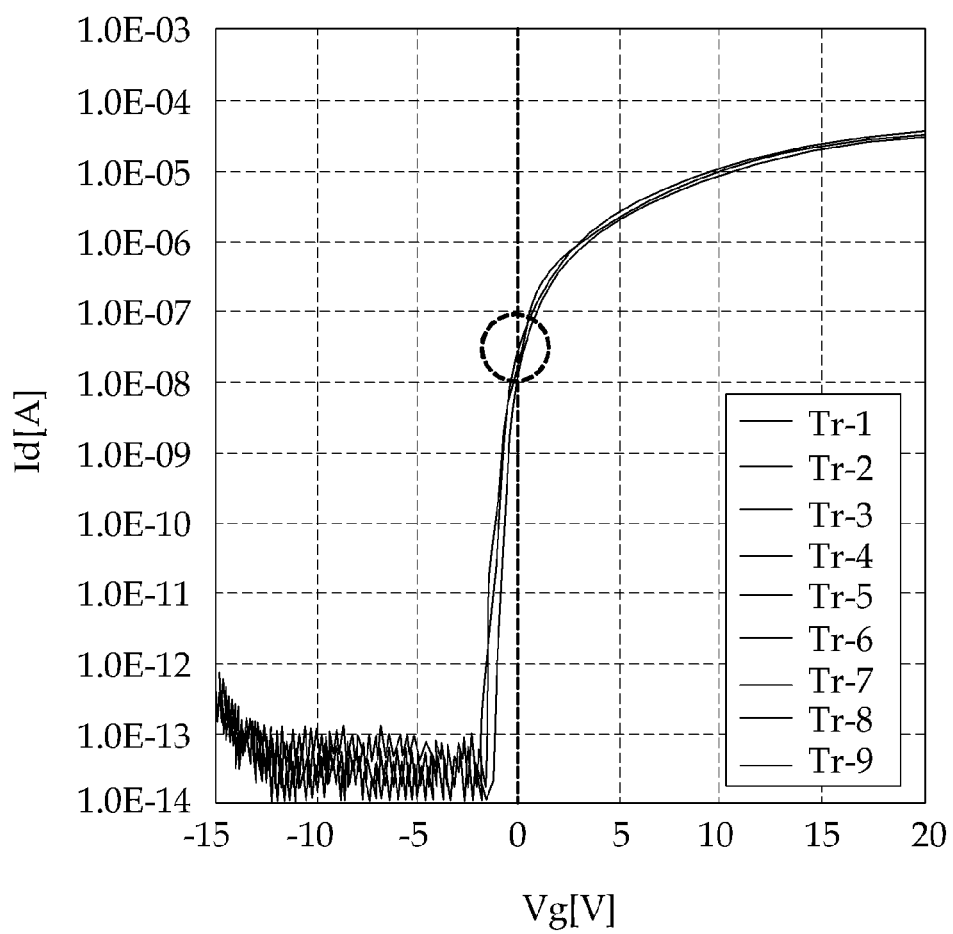
FIG. 2 is a graph illustrating a transfer characteristic $V_{GS}$-$I_D$ of an oxide TFT.
Figure 3:
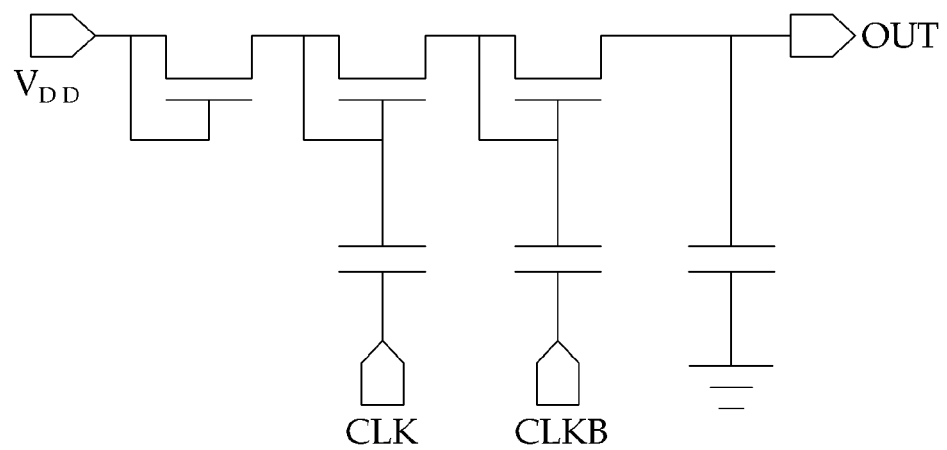
FIG. 3 is a diagram illustrating a DC voltage conversion circuit in the related art.
Figure 4:
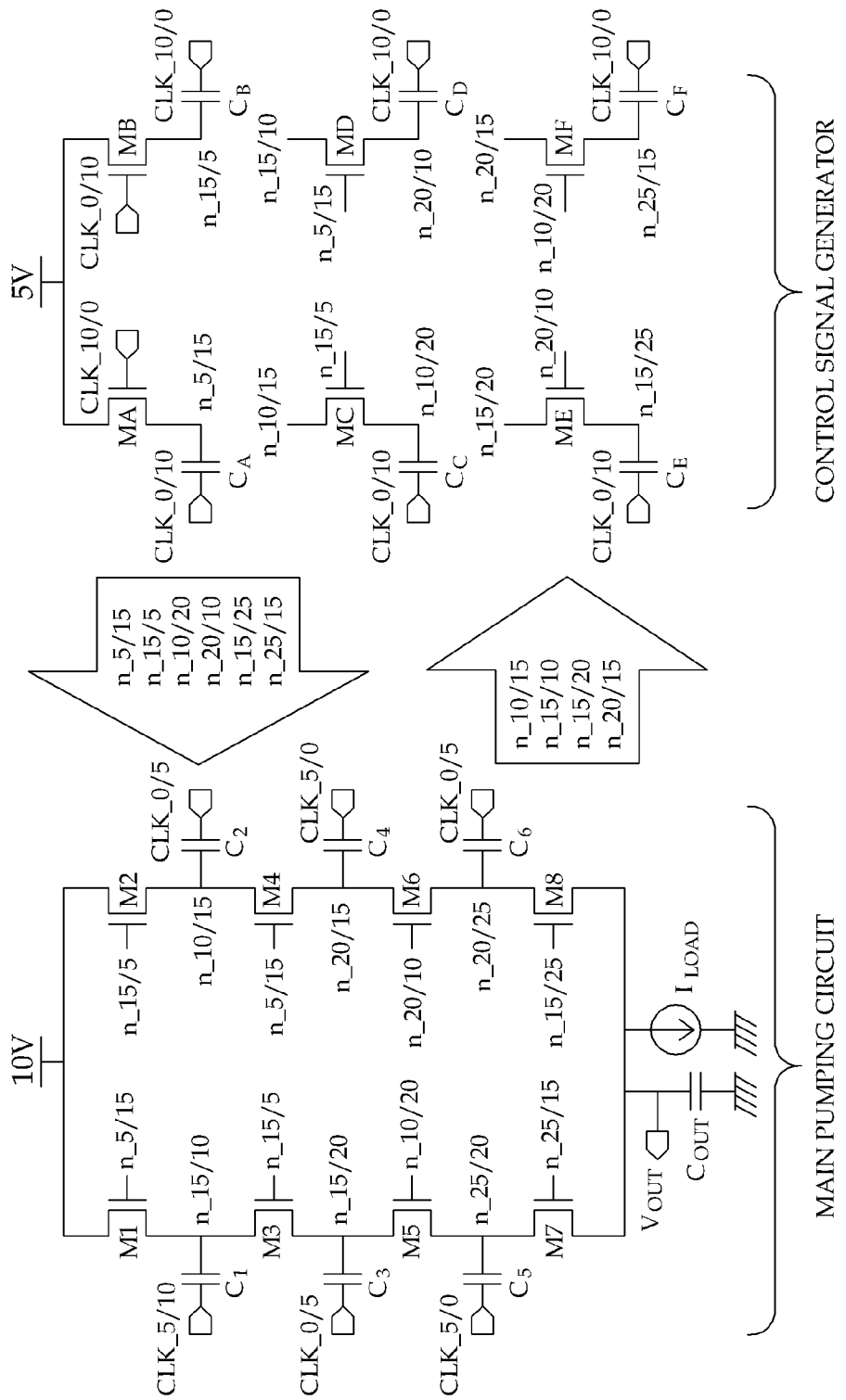
FIG. 4 is a diagram illustrating a DC voltage conversion circuit capable of increasing DC voltage $V_{DD}$ up to three times and outputting the increased DC voltage by improving the DC voltage conversion circuit in the related art.
Figure 5:
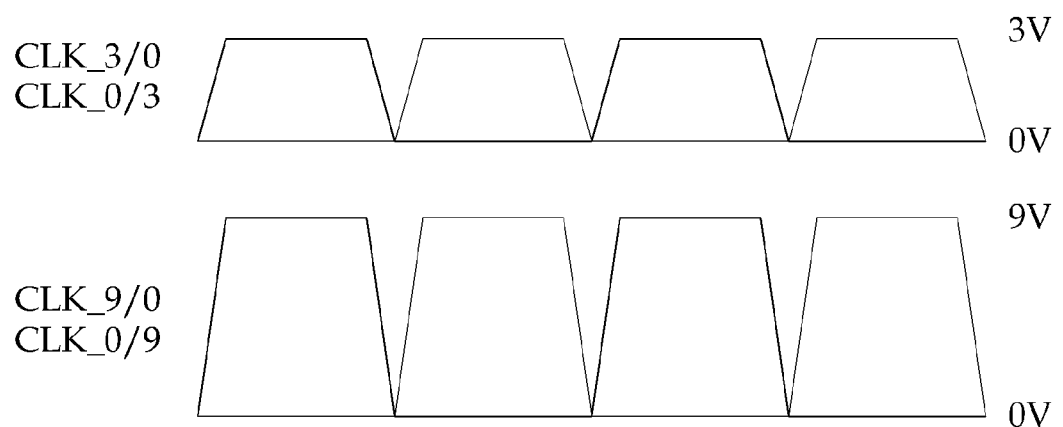
FIG. 5 is a timing diagram of a clock signal which is inputted to a DC voltage conversion circuit according to an exemplary embodiment of the present disclosure.

FIG. 5 is a timing diagram of a clock signal which is inputted to a DC voltage conversion circuit according to an exemplary embodiment of the present disclosure.

The DC voltage conversion circuit according to an exemplary embodiment of the present disclosure uses second power supply voltage $V_{DD2}$ and first power supply voltage $V_{DD1}$ having a smaller value than the second power supply voltage $V_{DD2}$. In addition, the DC voltage conversion circuit according to the exemplary embodiment of the present disclosure uses four clock signals, and each clock signal has an amplitude of the second power supply voltage $V_{DD2}$ or the first power supply voltage $V_{DD1}$ and has an opposite phase to each other. Values of the second power supply voltage $V_{DD2}$ and the first power supply voltage $V_{DD1}$ may be arbitrarily determined as necessary, and for convenience of the description, the exemplary embodiment of the present disclosure will be described by setting the values of the second power supply voltage $V_{DD2}$ and the first power supply voltage $V_{DD1}$ to 9 V and 3 V, respectively.

As illustrated in FIG. 5, the first power supply voltage $V_{DD1}$ is 3 V, and the second power supply voltage $V_{DD2}$ is 9 V. Further, a first clock signal CK_3/0 and a second clock signal CK_0/3 have an amplitude of the first power supply voltage $V_{DD1}$, and a third clock signal CK_9/0 and a fourth clock signal CK_0/9 have an amplitude of the second power supply voltage $V_{DD2}$. Herein, waveforms of the clock signals are not overlapped with each other, and frequencies of the clock signals may be changed.

Figure 6:
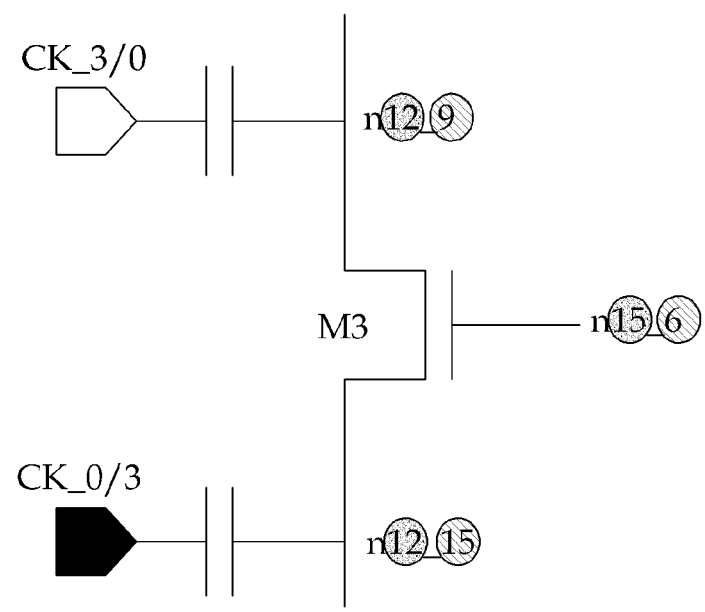
FIG. 6 is a diagram for describing a case where voltage is applied when an oxide TFT is turned on or off in a DC voltage conversion circuit according to the exemplary embodiment of the present disclosure.

FIG. 6 is a diagram for describing a case where voltage is applied when an oxide TFT is turned on or off in the DC voltage conversion circuit according to the exemplary embodiment of the present disclosure.

Referring to FIG. 6, when source voltage of an oxide thin film transistor (hereinafter, referred to as 'TFT') M3 is 12 V, 15 V is applied to a gate and thus the oxide TFT M3 is turned on. In this case, a source and a drain are connected to each other and thus drain voltage becomes 12 V. When the oxide TFT M3 is turned off, the gate voltage drops by the amplitude of 9 V and thus becomes 6 V, and the source voltage and drain voltage drop and rise by the amplitude of 3 V, respectively. Accordingly, since the source voltage becomes 9 V, gate-source voltage $V_{GS}$ becomes −3 V and thus the oxide TFT M3 is completely turned off.

Figure 7:
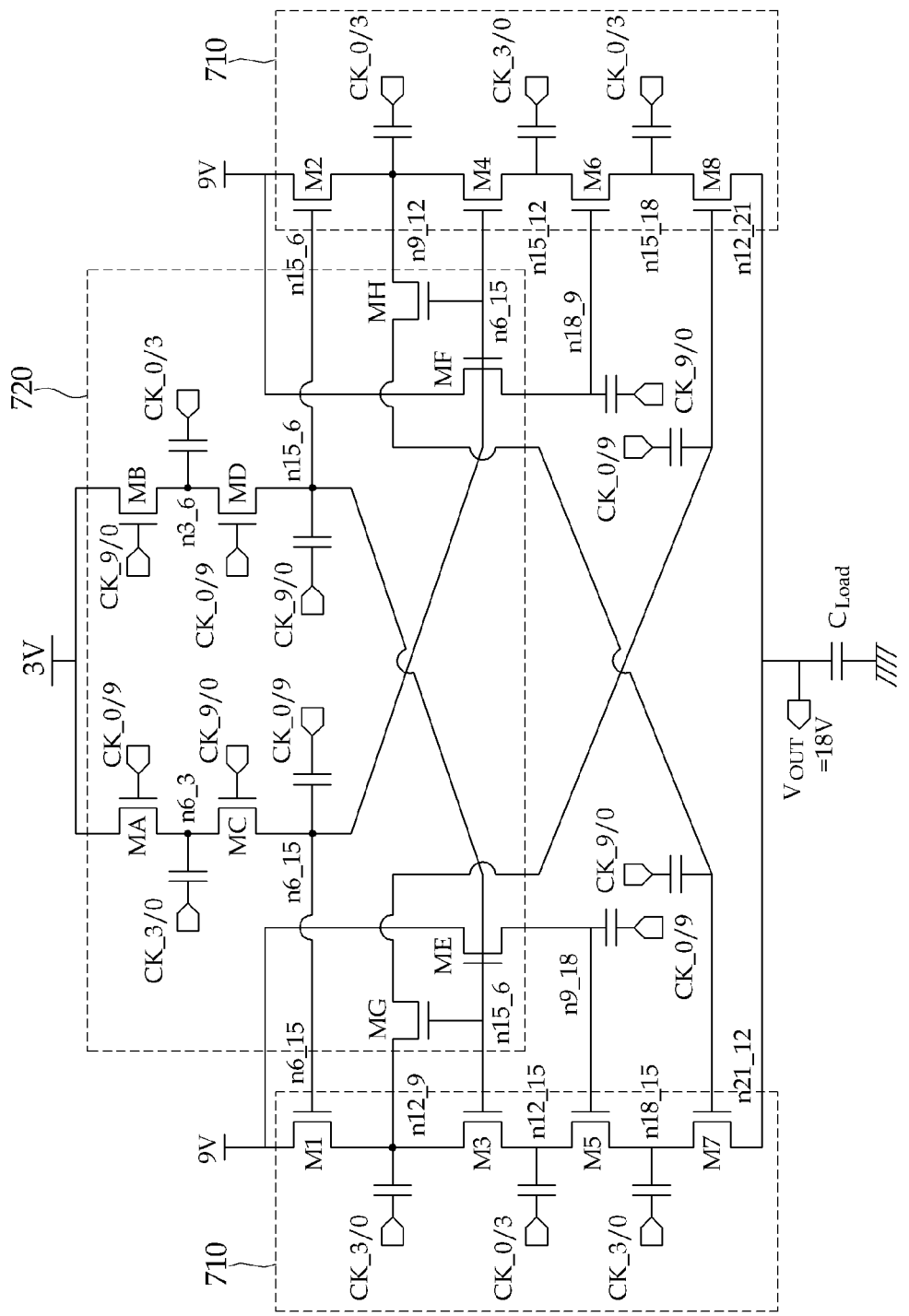
FIG. 7 is a diagram illustrating the overall configuration of a DC voltage conversion circuit according to the exemplary embodiment of the present disclosure.

FIG. 7 is a diagram illustrating the overall configuration of a DC voltage conversion circuit according to the exemplary embodiment of the present disclosure.

Referring to FIG. 7, the DC voltage conversion circuit according to the exemplary embodiment of the present disclosure includes a plurality of TFTs M1, M2, M3, M4, M5, M6, M7 and M8, and includes a main pumping circuit 710 in which the plurality of TFTs M1, M2, M3, M4, M5, M6, M7 and M8 are alternately turned on or off depending on voltages applied to the gates to output voltage for driving a liquid crystal display apparatus, and a switch control signal generator 720 which controls the voltages applied to the gates of the plurality of TFTs M1, M2, M3, M4, M5, M6, M7 and M8 in order to alternately turn on or off the plurality of TFTs M1, M2, M3, M4, M5, M6, M7 and M8 due to inversion of the clock signal. Herein, the two functional units 710 and 720 share nodes thereof to generate voltages and turn on/off the TFTs.

The main pumping circuit 710 according to the exemplary embodiment of the present disclosure includes a first TFT M1, a second TFT M2, a third TFT M3, a fourth TFT M4, a fifth TFT M5, a sixth TFT M6, a seventh TFT M7 and an eighth TFT M8.

In the first TFT M1, the second power supply voltage $V_{DD2}$ is applied to the source, a first node n6_15 is connected to the gate, and a second node n12_9 is connected to the drain. Herein, the fourth clock signal CK_0/9 is inputted to the first node n6_15, and the first clock signal CK_3/0 is inputted to the second node n12_9.

In the second TFT M2, the second power supply voltage $V_{DD2}$ is applied to the source, a third node n15_6 is connected to the gate, and a fourth node n9_12 is connected to the drain. Herein, the third clock signal CK_9/0 is inputted to the third node n15_6, and the second clock signal CK_0/3 is inputted to the fourth node n9_12.

In the third TFT M3, the second node n12_9 is connected to the source, the third node n15_6 is connected to the gate, and a fifth node n12_15 is connected to the drain. Herein, the first clock signal CK_3/0 is inputted to the second node n12_9, the third clock signal CK_9/0 is inputted to the third node n15_6, and the second clock signal CK_0/3 is inputted to the fifth node n12_15.

In the fourth TFT M4, the fourth node n9_12 is connected to the source, the first node n6_15 is connected to the gate, and a sixth node n15_12 is connected to the drain. Herein, the second clock signal CK_0/3 is inputted to the fourth node n9_12, the fourth clock signal CK_0/9 is inputted to the first node n6_15, and the first clock signal CK_3/0 is inputted to the sixth node n15_12.

In the fifth TFT M5, the fifth node n12_15 is connected to the source, a seventh node n9_18 is connected to the gate, and an eighth node n18_15 is connected to the drain. Herein, the second clock signal CK_0/3 is inputted to the fifth node n12_15, the fourth clock signal CK_0/9 is inputted to the seventh node n9_18, and the first clock signal CK_3/0 is inputted to the eighth node n18_15.

In the sixth TFT M6, the sixth node n15_12 is connected to the source, a ninth node n18_9 is connected to the gate, and a tenth node n15_18 is connected to the drain. Herein, the first clock signal CK_3/0 is inputted to the sixth node n15_12, the third clock signal CK_9/0 is inputted to the ninth node n18_9, and the second clock signal CK_0/3 is inputted to the tenth node n15_18.

In the seventh TFT M7, the eighth node n18_15 is connected to the source, an eleventh node n21_12 is connected to the gate, and an output node OUT is connected to the drain. Herein, the first clock signal CK_3/0 is inputted to the eighth node n18_15, and the third clock signal CK_9/0 is inputted to the eleventh node n21_12.

In the eighth TFT M8, the tenth node n15_18 is connected to the source, a twelfth node n12_21 is connected to the gate, and the output node OUT is connected to the drain. Herein, the second clock signal CK_0/3 is inputted to the tenth node n15_18, and the fourth clock signal CK_0/9 is inputted to the twelfth node n12_21.

The switch control signal generator 720 according to the exemplary embodiment of the present disclosure includes an eleventh TFT MA, a twelfth TFT MB, a thirteenth TFT MC, a fourteenth TFT MD, a fifteenth TFT ME, a sixteenth TFT MF, a seventeenth TFT MG and an eighteenth TFT MH.

In the eleventh TFT MA, the first power supply voltage $V_{DD1}$ is applied to the source, the fourth clock signal CK_0/9 is inputted to the gate, and a thirteenth node n6_3 is connected to the drain. Herein, the first clock signal CK_3/0 is inputted to the thirteenth node n6_3.

In the twelfth TFT MB, the first power supply voltage $V_{DD1}$ is applied to the source, the third clock signal CK_9/0 is inputted to the gate, and a fourteenth node n3_6 is connected to the drain. Herein, the second clock signal CK_0/3 is inputted to the fourteenth node n3_6.

In the thirteenth TFT MC, the thirteenth node n6_3 is connected to the source, the third clock signal CK_9/0 is inputted to the gate, and the first node n6_15 is connected to the drain. Herein, the first clock signal CK_3/0 is inputted to the thirteenth node n6_3, and the fourth clock signal CK_0/9 is inputted to the first node n6_15.

In the fourteenth TFT MD, the fourteenth node n3_6 is connected to the source, the fourth clock signal CK_0/9 is inputted to the gate, and the third node n15_6 is connected to the drain. Herein, the second clock signal CK_0/3 is inputted to the fourteenth node n3_6, and the third clock signal CK_9/0 is inputted to the third node n15_6.

In the fifteenth TFT ME, the second power supply voltage $V_{DD2}$ is applied to the source, the third node n15_6 is connected to the gate, and the seventh node n9_18 is connected to the drain. Herein, the third clock signal CK_9/0 is inputted to the third node n15_6, and the fourth clock signal CK_0/9 is inputted to the seventh node n9_18.

In the sixteenth TFT MF, the second power supply voltage $V_{DD2}$ is applied to the source, the first node n6_15 is connected to the gate, and the ninth node n18_9 is connected to the drain. Herein, the fourth clock signal CK_0/9 is inputted to the first node n6_15, and the third clock signal CK_9/0 is inputted to the ninth node n18_9.

In the seventeenth TFT MG, the second node n12_9 is connected to the source, the third node n15_6 is connected to the gate, and the twelfth node n12_21 is connected to the drain. Herein, the first clock signal CK_3/0 is inputted to the second node n12_9, the third clock signal CK_9/0 is inputted to the third node n15_6, and the fourth clock signal CK_0/9 is inputted to the twelfth node n12_21.

In the eighteenth TFT MH, the fourth node n9_12 is connected to the source, the first node n6_15 is connected to the gate, and the eleventh node n21_12 is connected to the drain. Herein, the second clock signal CK_0/3 is inputted to the fourth node n9_12, the fourth clock signal CK_0/9 is inputted to the first node n6_15, and the third clock signal CK_9/0 is inputted to the eleventh node n21_12.

Meanwhile, in the DC voltage conversion circuit according to the exemplary embodiment of the present disclosure, two situations of a first clock cycle $T_1$ and a second clock cycle $T_2$ repetitively occur by inversion of the clock signal.

That is, at the time of the first clock cycle $T_1$, the first clock signal CK_3/0 and the third clock signal CK_9/0 are in a "High" state, and the second clock signal CK_0/3 and the fourth clock signal CK_0/9 are in a "Low" state. Accordingly, the second TFT M2, the third TFT M3, the sixth TFT M6, the seventh TFT M7, the twelfth TFT MB, the thirteenth TFT MC, the fifteenth TFT ME and the seventeenth TFT MG are turned on, and the first TFT M1, the fourth TFT M4, the fifth TFT M5, the eighth TFT M8, the eleventh TFT MA, the fourteenth TFT MD, the sixteenth TFT MF and the eighteenth TFT MH are turned off.

At the time of the second clock cycle $T_2$, the first clock signal CK_3/0 and the third clock signal CK_9/0 are in a "Low" state, and the second clock signal CK_0/3 and the fourth clock signal CK_0/9 are in a "High" state. Accordingly, the second TFT M2, the third TFT M3, the sixth TFT M6, the seventh TFT M7, the twelfth TFT MB, the thirteenth TFT MC, the fifteenth TFT ME and the seventeenth TFT MG are turned off, and the first TFT M1, the fourth TFT M4, the fifth TFT M5, the eighth TFT M8, the eleventh TFT MA, the fourteenth TFT MD, the sixteenth TFT MF and the eighteenth TFT MH are turned on.

Hereinafter, operations of the main pumping circuit 710 and the switch control signal generator 720 according to the exemplary embodiment of the present disclosure will be described in detail, respectively.

Figure 8:
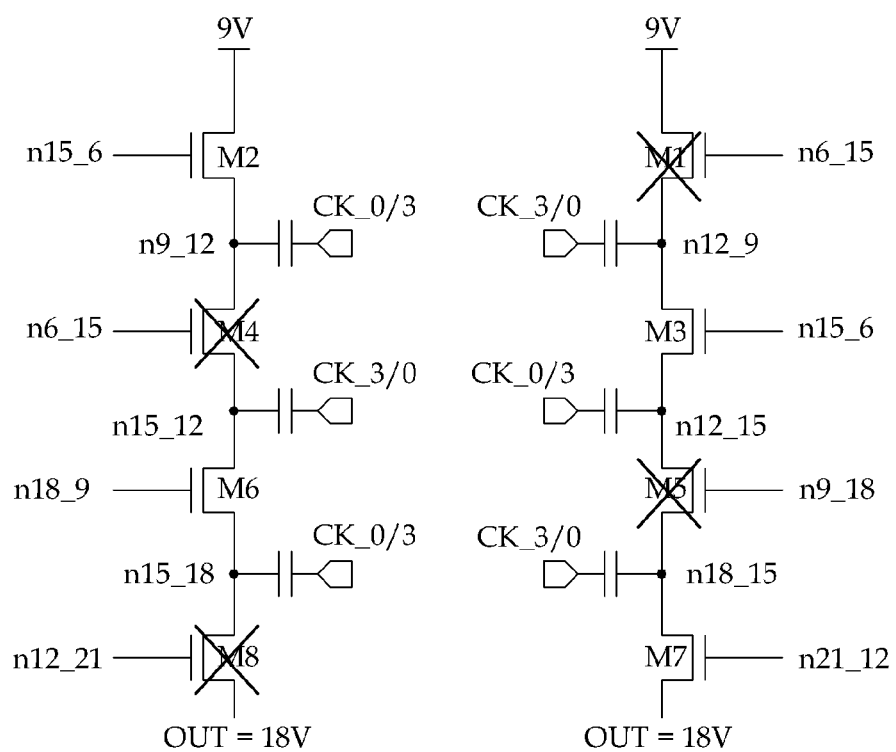
FIG. 8 is a diagram for describing an operation of a main pumping circuit according to the exemplary embodiment of the present disclosure at the time of a first clock cycle $T_1$.

FIG. 8 is a diagram for describing an operation of a main pumping circuit according to the exemplary embodiment of the present disclosure at the time of a first clock cycle $T_1$.

Referring to FIG. 8, the first TFT M1 is turned off when the voltage of the first node n6_15 connected to the gate becomes 6 V. In this case, the gate-source voltage $V_{GS}$ of the first TFT M1 is −3 V.

The second TFT M2 is turned on when the voltage of the third node n15_6 connected to the gate becomes 15 V. In this case, the gate-source voltage $V_{GS}$ of the second TFT M2 is 6 V. Accordingly, the second TFT M2 transfers 9 V of the second power supply voltage $V_{DD2}$ to the fourth node n9_12.

The third TFT M3 is turned on when the voltage of the third node n15_6 connected to the gate becomes 15 V. In this case, the gate-source voltage $V_{GS}$ of the third TFT M3 is 3 V. Accordingly, the third TFT M3 transfers 12 V of the second node n12_9 boosted by the first clock signal CK_3/0 to the fifth node n12_15.

The fourth TFT M4 is turned off when the voltage of the first node n6_15 connected to the gate becomes 6 V. In this case, the gate-source voltage $V_{GS}$ of the fourth TFT M4 is −3 V.

The fifth TFT M5 is turned off when the voltage of the seventh node n9_18 connected to the gate becomes 9 V. In this case, the gate-source voltage $V_{GS}$ of the fifth TFT M5 is −3 V.

The sixth TFT M6 is turned on when the voltage of the ninth node n18_9 connected to the gate becomes 18 V. In this case, the gate-source voltage $V_{GS}$ of the sixth TFT M6 is 3 V.

Accordingly, the sixth TFT M6 transfers 15 V of the sixth node n15_12 boosted by the first clock signal CK_3/0 to the tenth node n15_18.

The seventh TFT M7 is turned on when the voltage of the eleventh node n21_12 connected to the gate becomes 21 V. In this case, the gate-source voltage $V_{GS}$ of the seventh TFT M7 is 3 V. Accordingly, the seventh TFT M7 transfers 18 V of the eighth node n18_15 boosted by the first clock signal CK_3/0 to the output node OUT.

The eighth TFT M8 is turned off when the voltage of the twelfth node n12_21 connected to the gate becomes 12 V. In this case, the gate-source voltage $V_{GS}$ of the eighth TFT M8 is −3 V.

Figure 9:
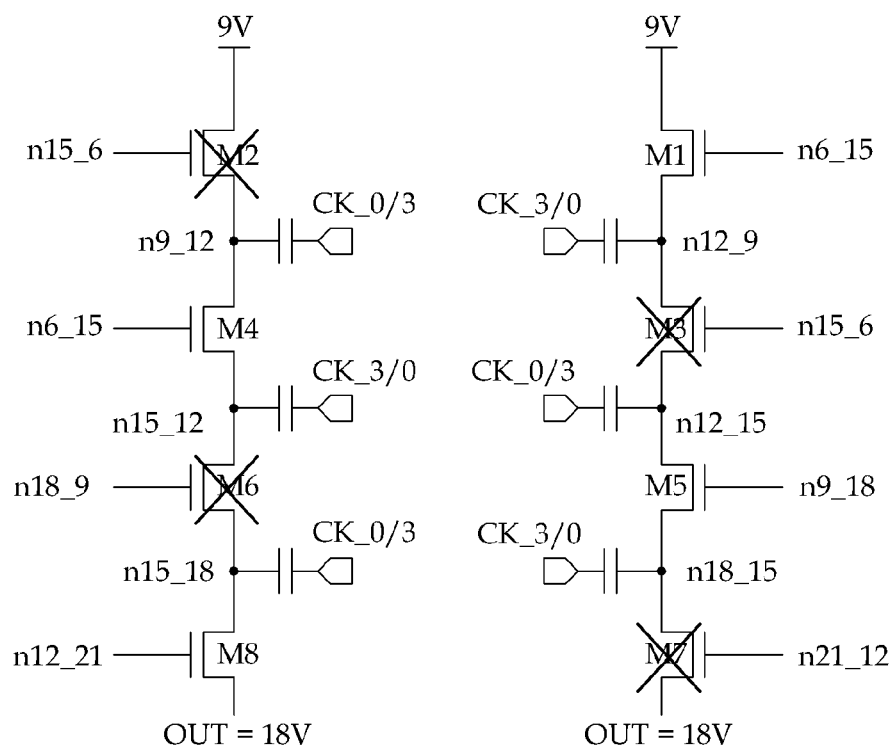
FIG. 9 is a diagram for describing an operation of a main pumping circuit according to the exemplary embodiment of the present disclosure at the time of a second clock cycle $T_2$.

FIG. 9 is a diagram for describing an operation of a main pumping circuit according to the exemplary embodiment of the present disclosure at the time of a second clock cycle $T_2$.

Referring to FIG. 9, the first TFT M1 is turned on when the voltage of the first node n6_15 connected to the gate becomes 15 V. In this case, the gate-source voltage $V_{GS}$ of the first TFT M1 is 6 V. Accordingly, the first TFT M1 transfers 9 V of the second power supply voltage $V_{DD2}$ to the second node n12_9.

The second TFT M2 is turned off when the voltage of the third node n15_6 connected to the gate becomes 6 V. In this case, the gate-source voltage $V_{GS}$ of the second TFT M2 is −3 V.

The third TFT M3 is turned off when the voltage of the third node n15_6 connected to the gate becomes 6 V. In this case, the gate-source voltage $V_{GS}$ of the third TFT M3 is −3 V.

The fourth TFT M4 is turned on when the voltage of the first node n6_15 connected to the gate becomes 15 V. In this case, the gate-source voltage $V_{GS}$ of the fourth TFT M4 is 3 V. Accordingly, the fourth TFT M4 transfers 12 V of the fourth node n9_12 boosted by the second clock signal CK_0/3 to the sixth node n15_12.

The fifth TFT M5 is turned on when the voltage of the seventh node n9_18 connected to the gate becomes 18 V. In this case, the gate-source voltage $V_{GS}$ of the fifth TFT M5 is 3 V. Accordingly, the fifth TFT M5 transfers 15 V of the fifth node n12_15 boosted by the second clock signal CK_0/3 to the eighth node n18_15.

The sixth TFT M6 is turned off when the voltage of the ninth node n18_9 connected to the gate becomes 9 V. In this case, the gate-source voltage $V_{GS}$ of the sixth TFT M6 is −3 V.

The seventh TFT M7 is turned off when the voltage of the eleventh node n21_12 connected to the gate becomes 12 V. In this case, the gate-source voltage $V_{GS}$ of the seventh TFT M7 is −3 V.

The eighth TFT M8 is turned on when the voltage of the twelfth node n12_21 connected to the gate becomes 21 V. In this case, the gate-source voltage $V_{GS}$ of the eighth TFT M8 is 3 V. Accordingly, the eighth TFT M8 transfers 18 V of the tenth node n15_18 boosted by the second clock signal CK_0/3 to the output node OUT.

Figure 10:
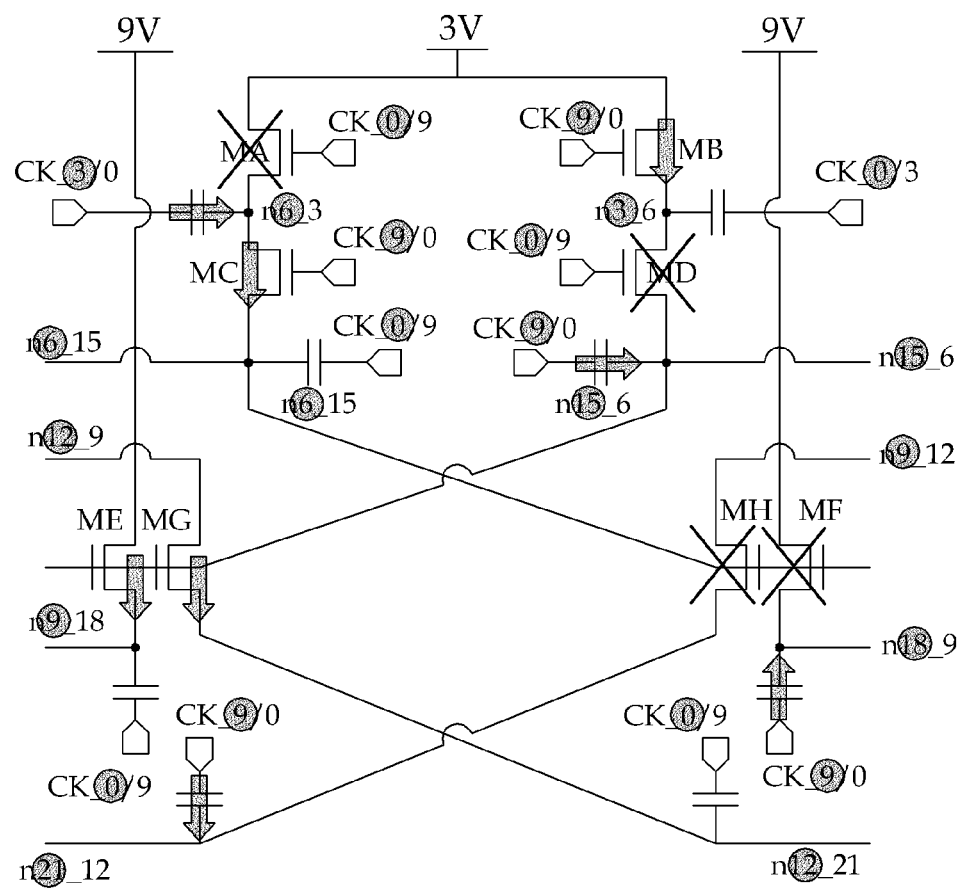
FIG. 10 is a diagram for describing an operation of a switch control signal generator according to the exemplary embodiment of the present disclosure at the time of a first clock cycle $T_1$.

FIG. 10 is a diagram for describing an operation of a switch control signal generator according to the exemplary embodiment of the present disclosure at the time of a first clock cycle $T_1$.

Referring to FIG. 10, the eleventh TFT MA is turned off when the voltage of the fourth clock signal CK_0/9 inputted to the gate becomes 0 V. In this case, the gate-source voltage $V_{GS}$ of the eleventh TFT MA is −3 V.

The twelfth TFT MB is turned on when the voltage of the third clock signal CK_9/0 inputted to the gate becomes 9 V. In this case, the gate-source voltage $V_{GS}$ of the twelfth TFT MB is 6 V. Accordingly, the twelfth TFT MB transfers the first power supply voltage $V_{DD1}$ to the fourteenth node n3_6.

The thirteenth TFT MC is turned on when the voltage of the third clock signal CK_9/0 inputted to the gate becomes 9 V. In this case, the gate-source voltage $V_{GS}$ of the thirteenth TFT MC is 3 V. Accordingly, the thirteenth TFT MC transfers 6 V of the thirteenth node n6_3 boosted by the first clock signal CK_3/0 to the first node n6_15.

The fourteenth TFT MD is turned off when the voltage of the fourth clock signal CK_0/9 inputted to the gate becomes 0 V. In this case, the gate-source voltage $V_{GS}$ of the fourteenth TFT MD is −3 V.

The fifteenth TFT ME is turned on when the voltage of the third node n15_6 connected to the gate becomes 15 V. In this case, the gate-source voltage $V_{GS}$ of the fifteenth TFT ME is 6 V. Accordingly, the fifteenth TFT ME transfers the second power supply voltage $V_{DD2}$ to the seventh node n9_18.

The sixteenth TFT MF is turned off when the voltage of the first node n6_15 connected to the gate becomes 6 V. In this case, the gate-source voltage $V_{GS}$ of the sixteenth TFT MF is −3 V.

The seventeenth TFT MG is turned on when the voltage of the third node n15_6 connected to the gate becomes 15 V. In this case, the gate-source voltage $V_{GS}$ of the seventeenth TFT MG is 3 V. Accordingly, the seventeenth TFT MG transfers 12 V of the second node n12_9 boosted by the first clock signal CK_3/0 to the twelfth node n12_21.

The eighteenth TFT MH is turned off when the voltage of the first node n6_15 connected to the gate becomes 6 V. In this case, the gate-source voltage $V_{GS}$ of the eighteenth TFT MH is −3 V.

Figure 11:
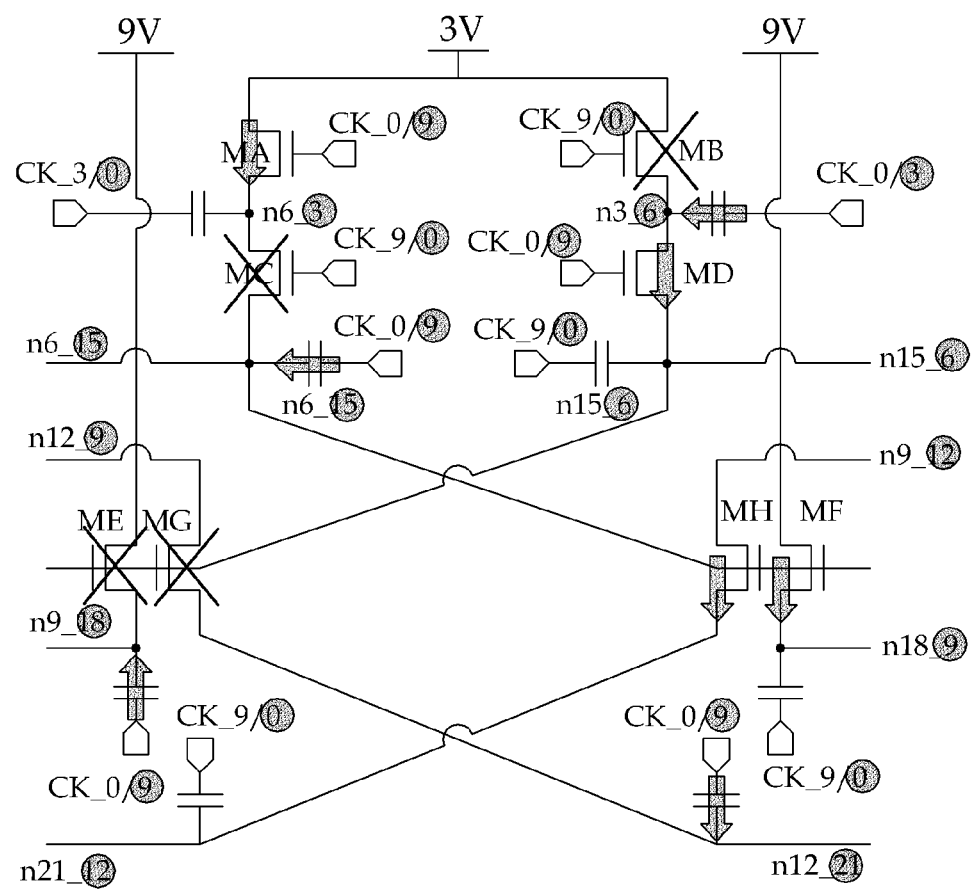
FIG. 11 is a diagram for describing an operation of a switch control signal generator according to the exemplary embodiment of the present disclosure at the time of a second clock cycle $T_2$.

FIG. 11 is a diagram for describing an operation of a switch control signal generator according to the exemplary embodiment of the present disclosure at the time of a second clock cycle $T_2$.

Referring to FIG. 11, the eleventh TFT MA is turned on when the voltage of the fourth clock signal CK_0/9 inputted to the gate becomes 9 V. In this case, the gate-source voltage $V_{GS}$ of the eleventh TFT MA is 6 V. Accordingly, the eleventh TFT MA transfers the first power supply voltage $V_{DD1}$ to the thirteenth node n6_3.

The twelfth TFT MB is turned off when the voltage of the third clock signal CK_9/0 inputted to the gate becomes 0 V. In this case, the gate-source voltage $V_{GS}$ of the twelfth TFT MB is −3V.

The thirteenth TFT MC is turned off when the voltage of the third clock signal CK_9/0 inputted to the gate becomes 0 V. In this case, the gate-source voltage $V_{GS}$ of the thirteenth TFT MC is −3 V.

The fourteenth TFT MD is turned on when the voltage of the fourth clock signal CK_0/9 inputted to the gate becomes 9 V. In this case, the gate-source voltage $V_{GS}$ of the fourteenth TFT MD is 3 V. Accordingly, the fourteenth TFT MD transfers 6 V of the fourteenth node n3_6 boosted by the second clock signal CK_0/3 to the third node n15_6.

The fifteenth TFT ME is turned off when the voltage of the third node n15_6 connected to the gate becomes 6 V. In this case, the gate-source voltage $V_{GS}$ of the fifteenth TFT ME is −3V.

The sixteenth TFT MF is turned on when the voltage of the first node n6_15 connected to the gate becomes 15 V. In this case, the gate-source voltage $V_{GS}$ of the sixteenth TFT MF is 6 V. Accordingly, the sixteenth TFT MF transfers the second power supply voltage $V_{DD2}$ to the ninth node n18_9.

The seventeenth TFT MG is turned off when the voltage of the third node n15_6 connected to the gate becomes 6 V. In this case, the gate-source voltage $V_{GS}$ of the seventeenth TFT MG is −3 V.

The eighteenth TFT MH is turned on when the voltage of the first node n6_15 connected to the gate becomes 15 V. In this case, the gate-source voltage $V_{GS}$ of the eighteenth TFT MH is 3 V. Accordingly, the eighteenth TFT MH transfers 12 V of the fourth node n9_12 boosted by the second clock signal CK_0/3 to the eleventh node n21_12.

Figure 12:
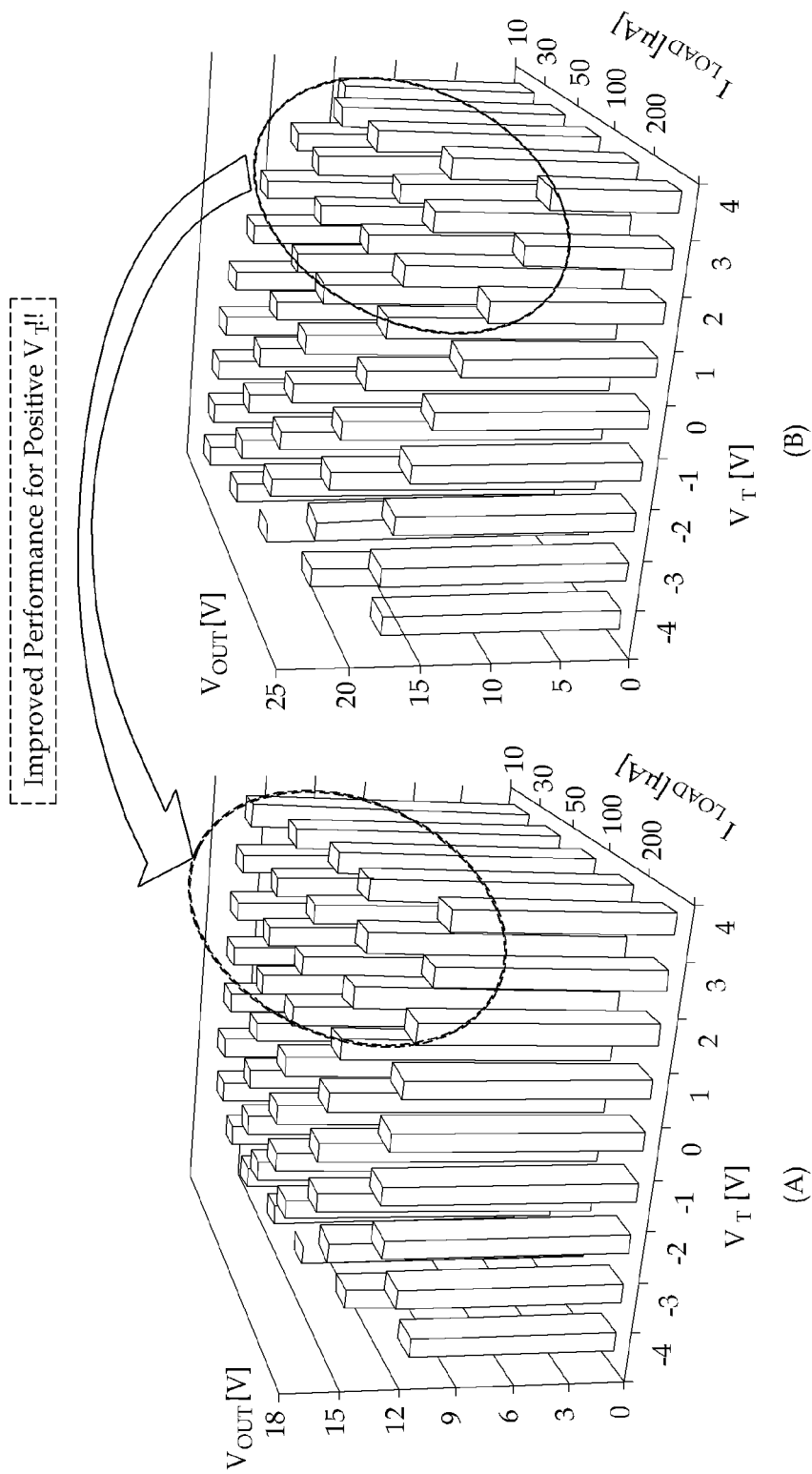
FIG. 12 is a graph comparing output voltages of a DC voltage conversion circuit according to the exemplary embodiment of the present disclosure and a DC voltage conversion circuit in the related art.

FIG. 12 is a graph comparing output voltages of a DC voltage conversion circuit according to the exemplary embodiment of the present disclosure and a DC voltage conversion circuit in the related art.

In FIG. 12, output voltages of two circuits will be compared with each other under the condition in which threshold voltage $V_T$ of the TFT is −4 V to +4 V, and the output current is 10 uA to 200 uA.

Referring to FIG. 12, FIG. 12A is a graph illustrating output voltage of a DC voltage conversion circuit according to the exemplary embodiment of the present disclosure, and FIG. 12B is a graph illustrating output voltage of a DC voltage conversion circuit in the related art. The DC voltage conversion circuit according to the exemplary embodiment of the present disclosure generates stable output voltage as compared with the DC voltage conversion circuit in the related art. Particularly, it is verified that the DC voltage conversion circuit according to the exemplary embodiment of the present disclosure more stably operates in a positive threshold voltage $V_T$ region which is a general situation. This is because the TFT is sufficiently turned on even under the positive threshold voltage $V_T$ condition and thus the DC voltage conversion circuit operates normally.

Figure 13:
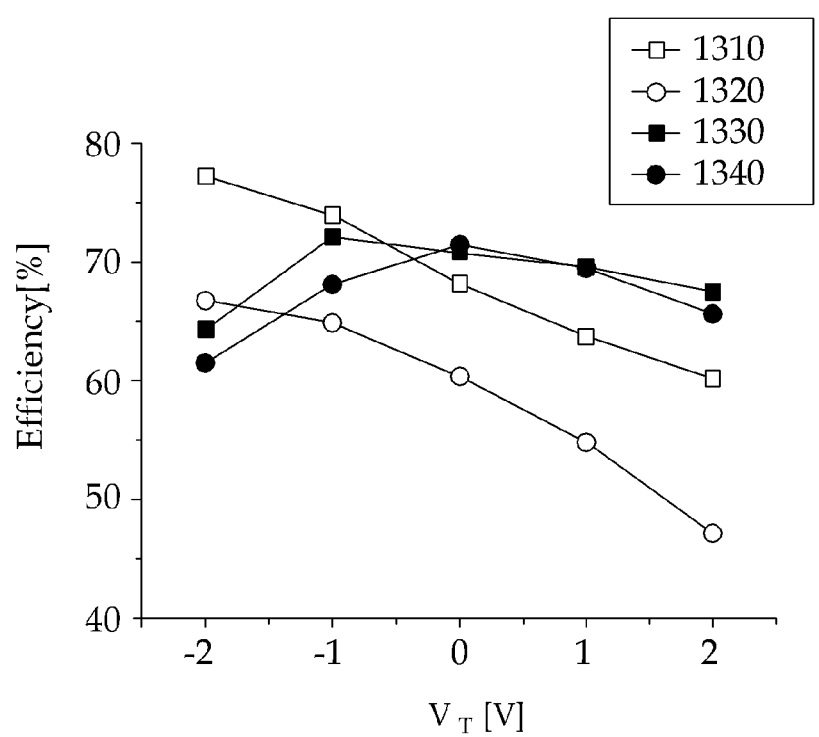
FIG. 13 is a graph comparing power efficiencies of a DC voltage conversion circuit according to the exemplary embodiment of the present disclosure and a DC voltage conversion circuit in the related art.

FIG. 13 is a graph comparing power efficiencies of a DC voltage conversion circuit according to the exemplary embodiment of the present disclosure and a DC voltage conversion circuit in the related art.

Referring to FIG. 13, reference numeral 1310 represents power efficiency of the DC voltage conversion circuit in the related art under the condition where output current is 100 uA, reference numeral 1320 represents power efficiency of the DC voltage conversion circuit in the related art under the condition where output current is 200 uA, reference numeral 1330 represents power efficiency of the DC voltage conversion circuit according to the exemplary embodiment of the present disclosure under the condition where output current is 100 uA, and reference numeral 1340 represents power efficiency of the DC voltage conversion circuit according to the exemplary embodiment of the present disclosure under the condition where output current is 200 uA.

As illustrated in FIG. 13, it is verified that the DC voltage conversion circuit according to the exemplary embodiment of the present disclosure has higher power efficiency than the DC voltage conversion circuit in the related art. In particular, the DC voltage conversion circuit according to the exemplary embodiment of the present disclosure has significantly excellent power efficiency under the positive threshold voltage $V_T$ condition.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A DC voltage conversion circuit of a liquid crystal display apparatus, comprising:
a main pumping circuit including a plurality of thin film transistors and configured to output voltage for driving a liquid crystal display apparatus when the plurality of thin film transistors are alternately turned on or off; and
a switch control signal generator configured to control voltages applied to gates of the plurality of thin film transistors by inversion of a clock signal,
wherein each thin film transistor is turned on when positive gate-source voltage is applied thereto, and turned off when negative gate-source voltage is applied thereto,
wherein the main pumping circuit includes:
a first thin film transistor in which second power supply voltage is applied to a source, a first node is connected to a gate, and a second node is connected to a drain;
a second thin film transistor in which the second power supply voltage is applied to a source, a third node is connected to a gate, and a fourth node is connected to a drain;
a third thin film transistor in which the second node is connected to a source, the third node is connected to a gate, and a fifth node is connected to a drain;
a fourth thin film transistor in which the fourth node is connected to a source, the first node is connected to a gate, and a sixth node is connected to a drain;
a fifth thin film transistor in which the fifth node is connected to a source, a seventh node is connected to a gate, and an eighth node is connected to a drain;
a sixth thin film transistor in which the sixth node is connected to a source, a ninth node is connected to a gate, and a tenth node is connected to a drain;
a seventh thin film transistor in which the eighth node is connected to a source, an eleventh node is connected to a gate, and an output node is connected to a drain; and
an eighth thin film transistor in which the tenth node is connected to a source, a twelfth node is connected to a gate, and the output node is connected to a drain, and
wherein a first clock signal is inputted to the second node, the sixth node and the eighth node, a second clock signal is inputted to the fourth node, the fifth node and the tenth node, a third clock signal is inputted to the third node, the ninth node and the eleventh node, and a fourth clock signal is inputted to the first node, the seventh node and the twelfth node.

2. The DC voltage conversion circuit of a liquid crystal display apparatus of claim 1, wherein the switch control signal generator includes:
an eleventh thin film transistor in which the first power supply voltage is applied to a source, the fourth clock signal is inputted to a gate, and a thirteenth node is connected to a drain;
an twelfth thin film transistor in which the first power supply voltage is applied to a source, the third clock signal is inputted to a gate, and a fourteenth node is connected to a drain;
a thirteenth thin film transistor in which the thirteenth node is connected to a source, the third clock signal is inputted to a gate, and the first node is connected to a drain;
a fourteenth thin film transistor in which the fourteenth node is connected to a source, the fourth clock signal is inputted to a gate, and the third node is connected to a drain;
a fifteenth thin film transistor in which the second power supply voltage is applied to a source, the third node is connected to a gate, and the seventh node is connected to a drain;

a sixteenth thin film transistor in which the second power supply voltage is applied to a source, the first node is connected to a gate, and the ninth node is connected to a drain;

a seventeenth thin film transistor in which the second node is connected to a source, the third node is connected to a gate, and the twelfth node is connected to a drain; and an eighteenth thin film transistor in which the fourth node is connected to a source, the first node is connected to a gate, and the eleventh node is connected to a drain, wherein the first clock signal is inputted to the thirteenth node, and the second clock signal is inputted to the fourteenth node.

3. The DC voltage conversion circuit of a liquid crystal display apparatus of claim 2, wherein when the first clock signal and the third clock signal become in a "High" state, and the second clock signal and the fourth clock signal become in a "Low" state, the second thin film transistor, the third thin film transistor, the sixth thin film transistor, the seventh thin film transistor, the twelfth thin film transistor, the thirteenth thin film transistor, the fifteenth thin film transistor and the seventeenth thin film transistor are turned on, and the first thin film transistor, the fourth thin film transistor, the fifth thin film transistor, the eighth thin film transistor, the eleventh thin film transistor, the fourteenth thin film transistor, the sixteenth thin film transistor and the eighteenth thin film transistor are turned off.

4. The DC voltage conversion circuit of a liquid crystal display apparatus of claim 3, wherein the second thin film transistor, the third thin film transistor, the sixth thin film transistor, the seventh thin film transistor, the twelfth thin film transistor, the thirteenth thin film transistor, the fifteenth thin film transistor and the seventeenth thin film transistor are turned on when positive gate-source voltage is applied, and the first thin film transistor, the fourth thin film transistor, the fifth thin film transistor, the eighth thin film transistor, the eleventh thin film transistor, the fourteenth thin film transistor, the sixteenth thin film transistor and the eighteenth thin film transistor are turned off when negative gate-source voltage is applied.

5. The DC voltage conversion circuit of a liquid crystal display apparatus of claim 2, wherein when the first clock signal and the third clock signal become in a "Low" state, and the second clock signal and the fourth clock signal become in a "High" state, the second thin film transistor, the third thin film transistor, the sixth thin film transistor, the seventh thin film transistor, the twelfth thin film transistor, the thirteenth thin film transistor, the fifteenth thin film transistor and the seventeenth thin film transistor are turned off, and the first thin film transistor, the fourth thin film transistor, the fifth thin film transistor, the eighth thin film transistor, the eleventh thin film transistor, the fourteenth thin film transistor, the sixteenth thin film transistor and the eighteenth thin film transistor are turned on.

6. The DC voltage conversion circuit of a liquid crystal display apparatus of claim 5, wherein the second thin film transistor, the third thin film transistor, the sixth thin film transistor, the seventh thin film transistor, the twelfth thin film transistor, the thirteenth thin film transistor, the fifteenth thin film transistor and the seventeenth thin film transistor are turned off when negative gate-source voltage is applied, and the first thin film transistor, the fourth thin film transistor, the fifth thin film transistor, the eighth thin film transistor, the eleventh thin film transistor, the fourteenth thin film transistor, the sixteenth thin film transistor and the eighteenth thin film transistor are turned on when positive gate-source voltage is applied.

* * * * *